United States Patent
Serdynski et al.

(10) Patent No.: US 7,667,341 B2
(45) Date of Patent: Feb. 23, 2010

(54) POWER-GENERATING APPARATUS, SUCH AS A GENERATOR

(75) Inventors: David P. Serdynski, Waukesha, WI (US); Andrew G. Gongola, Butler, WI (US); John G. Marx, Hartford, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 11/863,381

(22) Filed: Sep. 28, 2007

(65) Prior Publication Data

US 2008/0079264 A1 Apr. 3, 2008

Related U.S. Application Data

(60) Provisional application No. 60/827,529, filed on Sep. 29, 2006.

(51) Int. Cl.
*H02K 5/00* (2006.01)
(52) U.S. Cl. .................................. 290/30 A
(58) Field of Classification Search ............... 290/30 A
See application file for complete search history.

(56) References Cited

U.S. PATENT DOCUMENTS

| | | | |
|---|---|---|---|
| 2,898,542 A * | 8/1959 | Cholick et al. ............... 322/90 |
| 3,694,729 A * | 9/1972 | Jones .......................... 307/150 |
| 4,760,797 A * | 8/1988 | Stubbs et al. ................ 104/12 |
| 4,856,470 A | 8/1989 | Ishii et al. |
| 4,907,546 A | 3/1990 | Ishii et al. |
| 4,928,204 A | 5/1990 | Wang |
| 5,212,952 A * | 5/1993 | Yokoyama et al. ............ 60/721 |
| 5,689,174 A * | 11/1997 | Pacheco, Sr. ................ 322/16 |
| 5,726,503 A | 3/1998 | Domanski et al. |
| 5,887,927 A | 3/1999 | Kurek, III et al. |
| D416,858 S | 11/1999 | Domanski |
| D418,809 S | 1/2000 | Frank |
| 6,012,285 A | 1/2000 | Lutz et al. |
| 6,019,084 A | 2/2000 | Haynes et al. |
| 6,034,511 A * | 3/2000 | Scott et al. ..................... 322/46 |
| 6,066,937 A * | 5/2000 | Gutierrez et al. ............ 320/104 |
| 6,084,313 A | 7/2000 | Frank |
| 6,181,019 B1 | 1/2001 | Frank |
| 6,222,343 B1 | 4/2001 | Crisp et al. |
| 6,310,404 B1 | 10/2001 | Frank |

(Continued)

FOREIGN PATENT DOCUMENTS

JP          10327513 A   *  12/1998

OTHER PUBLICATIONS

"Heavy-Duty Jobsite Generators", DeWalt Catalog, Jan. 2007, 2 pages.

(Continued)

*Primary Examiner*—Joseph Waks
(74) *Attorney, Agent, or Firm*—Michael Best & Friedrich LLP

(57) ABSTRACT

A power-generating apparatus includes a frame, an engine supported by the frame, an alternator coupled to the engine and operable to convert mechanical energy from the engine into electrical energy, and a battery charger supported by the frame and electrically coupled to the alternator. The battery charger is operable to charge a battery pack with the electrical energy from the alternator.

14 Claims, 7 Drawing Sheets

U.S. PATENT DOCUMENTS

| | | |
|---|---|---|
| 6,313,543 B1 | 11/2001 | Frank |
| D454,357 S | 3/2002 | Diels |
| 6,368,133 B1 | 4/2002 | Zeiler et al. |
| D458,220 S | 6/2002 | Vetter |
| 6,456,035 B1 | 9/2002 | Crisp et al. |
| 6,471,476 B1 | 10/2002 | Diels et al. |
| 6,525,430 B1 * | 2/2003 | Asai et al. .................... 290/1 A |
| D472,519 S | 4/2003 | Buck |
| 6,581,245 B2 | 6/2003 | Jen |
| 6,609,924 B2 | 8/2003 | Zeiler et al. |
| 6,618,275 B2 | 9/2003 | Suzuki et al. |
| D489,327 S | 5/2004 | Imai |
| 6,750,556 B2 | 6/2004 | Sodemann et al. |
| D494,929 S | 8/2004 | Imai |
| 6,801,425 B2 | 10/2004 | Buck et al. |
| 6,806,680 B2 | 10/2004 | Zeiler |
| D501,182 S | 1/2005 | Buck |
| D507,529 S | 7/2005 | Lee |
| 6,927,511 B2 * | 8/2005 | Cleanthous et al. ........... 310/58 |
| D509,795 S | 9/2005 | Buck |
| D516,508 S | 3/2006 | Johnson |
| D519,923 S | 5/2006 | Imai |
| 7,180,200 B2 | 2/2007 | Walter et al. |
| 7,309,928 B2 * | 12/2007 | Grant et al. .................. 290/1 A |
| 7,432,613 B2 * | 10/2008 | Jabaji et al. ................. 307/10.6 |
| 2003/0052651 A1 | 3/2003 | Crisp et al. |
| 2004/0012204 A1 | 1/2004 | Walter et al. |
| 2004/0256923 A1 * | 12/2004 | Cleanthous et al. ........... 310/58 |
| 2006/0170218 A1 | 8/2006 | Grant et al. |
| 2007/0221515 A1 * | 9/2007 | Lindley ..................... 206/223 |

OTHER PUBLICATIONS

UK Intellectual Property Office Search Report under Section 17 dated Dec. 6, 2007 for Application No. GB0718958.2.

* cited by examiner

# POWER-GENERATING APPARATUS, SUCH AS A GENERATOR

CROSS-REFERENCE TO RELATED APPLICATIONS

This application claims priority to U.S. Provisional Patent Application No. 60/827,529, entitled "Power-Generating Apparatus, Such as a Generator", filed Sep. 29, 2006 by John G. Marx, David P. Serdynski, and Andrew G. Gongola, the entire contents of which is hereby incorporated by reference.

BACKGROUND

The present invention relates to power-generating apparatus and, more particularly, to generators.

Generators are commonly used at work sites or other remote locations to provide power (e.g., electricity) where access to standard utility power is unavailable. Generators can also provide a source of back-up power in the event of a utility power failure. Some generators are sized and configured such that they may be moved from one place to another. Such portable generators typically include an internal combustion engine coupled to an alternator or a direct-current ("DC") generator. The alternator or the DC generator converts power from the engine into a usable form for a secondary device such as, for example, a power tool, a work light, a pump, a blower, or other electrical appliance. However, the secondary device is typically a separate component from the generator and is, therefore, susceptible to being lost, stolen, and/or damaged.

SUMMARY

In one embodiment, the invention provides a power-generating apparatus including a frame, an engine supported by the frame, an alternator coupled to the engine and operable to convert mechanical energy from the engine into electrical energy, and a battery charger supported by the frame and electrically coupled to the alternator. The battery charger is operable to charge a battery pack with the electrical energy from the alternator.

In another embodiment, the invention provides a power-generating apparatus including a frame, an engine supported by the frame, an alternator coupled to the engine and operable to convert mechanical energy from the engine into electrical energy, and a battery charger securely fastened to the frame and electrically coupled to the alternator. The battery charger includes at least one receptacle. Each receptacle is configured to support a battery pack.

In yet another embodiment, the invention provides a power-generating apparatus including a frame, an engine supported by the frame and including a starter motor, an alternator coupled to the engine and operable to convert mechanical energy from the engine into electrical energy, and a control panel supported by the frame. The control panel includes an outlet electrically coupled to the alternator and operable to supply the electrical energy from the alternator to a secondary device. The power-generating apparatus also includes a battery charger positioned on the control panel and electrically coupled to the alternator. The battery charger includes at least one receptacle. The power-generating apparatus further includes a battery pack configured to be supported by the at least one receptacle to facilitate charging of the battery pack and an engine start circuit electrically coupled to the starter motor and the battery charger. The engine start circuit is operable to direct power from the battery pack to the starter motor to start the engine.

Other aspects of the invention will become apparent by consideration of the detailed description and accompanying drawings.

Figure 1:
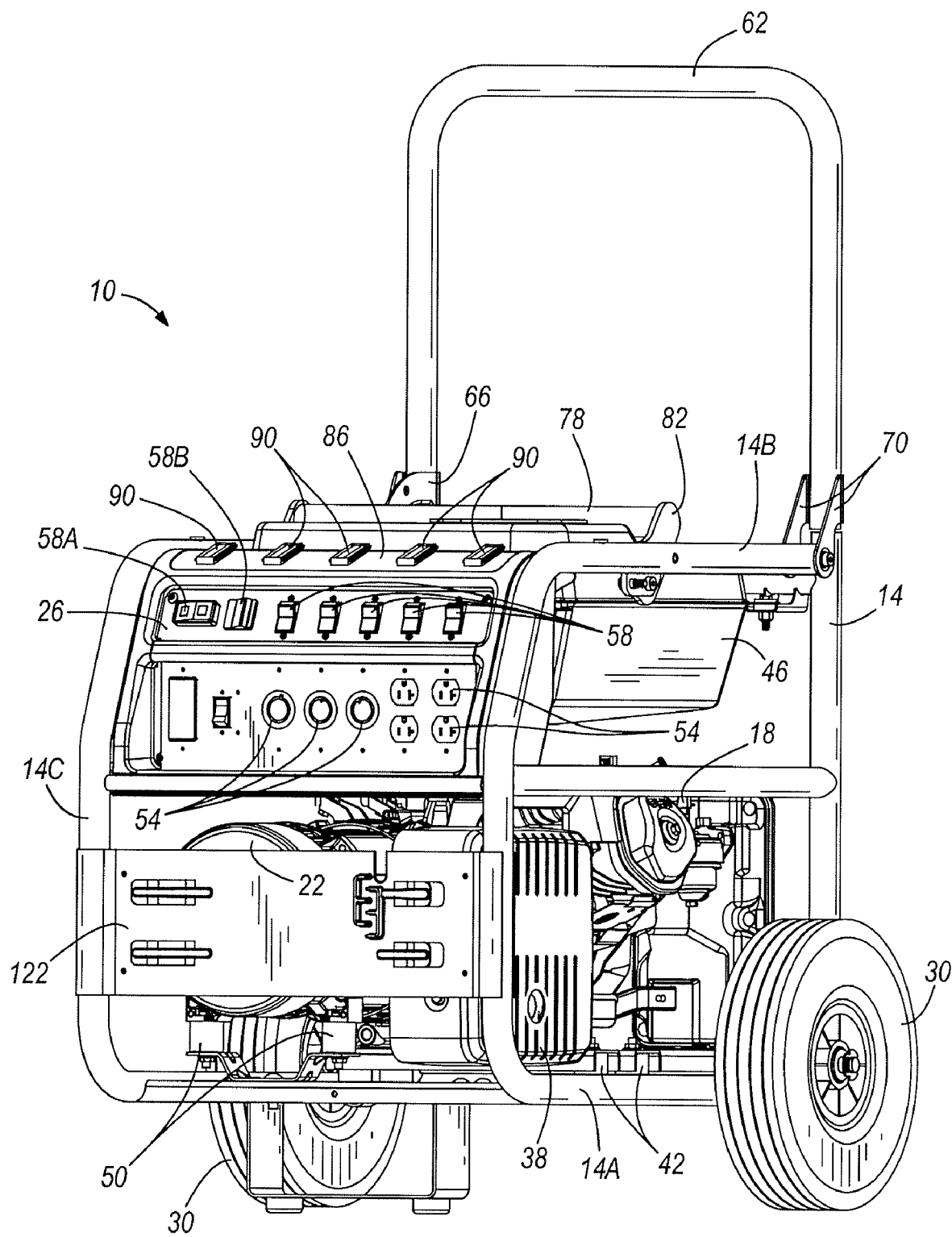
FIG. 1 is a perspective view of a power-generating apparatus according to one embodiment of the invention.

Before any independent features and at least one embodiment of the invention is explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting. Although references are made below to directions, such as left, right, up, down, top, bottom, front, rear, forward, back, etc., in describing the drawings, the references are made relative to the drawings (as normally viewed) for convenience. These directions are not intended to be taken literally or to limit the present invention in any form.

DETAILED DESCRIPTION

FIGS. 1 to 6 illustrate a power-generating apparatus 10, such as, for example, a generator. The illustrated generator 10 includes a frame 14, a power-generating device 18, an alternator 22, and a control panel 26. In the illustrated construction, the frame 14 is supported by wheels 30 for movement over the ground such that the generator 10 is portable to and from a work site or other location.

The illustrated frame 14 provides a protective structure to protect components of or connected to the generator 10. In the illustrated construction, the protective structure is composed of metal tubing that is bent and welded to, among other things, preserve distinctiveness of a more complex design. The illustrated tubing has a diameter of about 1.25 inches. The industry standard diameter for frame members is 1.125 inches; therefore, the illustrated frame 14 is more robust and at least has a more robust appearance. In addition, the "open" appearance of the frame 14 provides, among other things, access to the components of the generator 10 (e.g., the power-generating device 18, the alternator 22, etc.) for maintenance as well as allowing a cooling airflow to pass over the components during operation of the generator 10.

Figure 6:
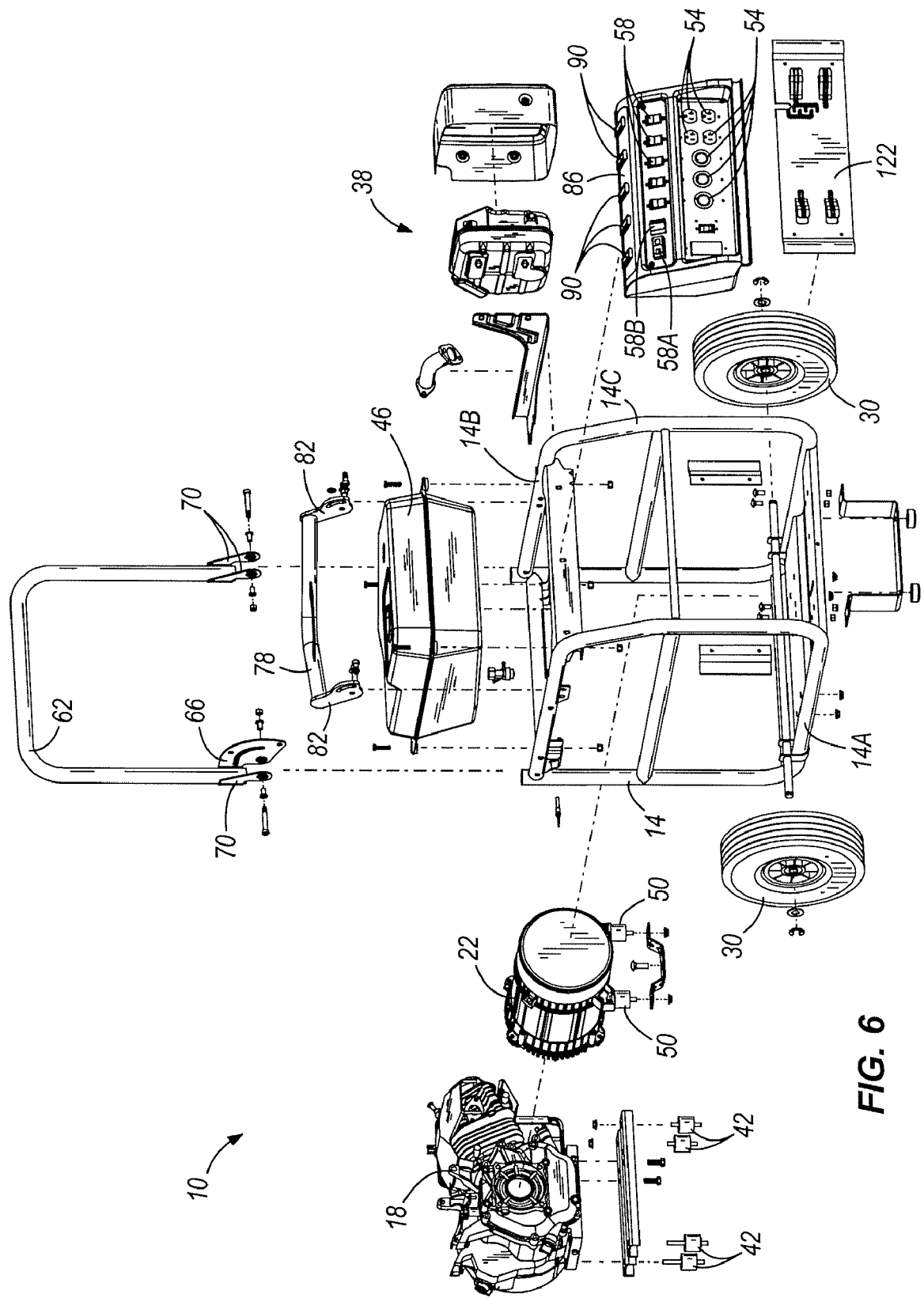
FIG. 6 is an exploded view of the power-generating apparatus shown in FIG. 1.

In the illustrated construction, the power-generating device 18 is an internal-combustion engine operable to produce mechanical energy, or power. The illustrated engine 18 is coupled to an electric starter motor 34, the alternator 22, and an air filter assembly 38. As further described below, the starter motor 34 is connectable to a power tool battery pack 94 (FIG. 8) to start the engine 18. Referring to FIG. 6, the engine 18 is mounted to a bottom portion 14A of the frame 14 with vibration damping elements 42 (e.g., springs, elastomeric pads, etc.) positioned therebetween to help reduce the amount and intensity of vibrations transmitted to the frame 14 during operation of the engine 18.

In the illustrated construction, the engine 18 is in fluid communication with a fuel tank 46. The fuel tank 46 supplies fuel (e.g., gasoline, diesel fuel, etc.) to the engine 18 and is supported by the frame 14 proximate to a top portion 14B of the frame 14 such that the fuel tank 46 may be easily refilled by a user.

The alternator 22 is operable to convert the mechanical energy produced by the engine 18 into electrical energy, or electricity. Similar to the engine 18, the illustrated alternator 22 is mounted to the bottom portion 14A of the frame 14 with vibration damping elements 50 positioned therebetween to help reduce the amount and intensity of vibrations transmitted to the frame 14 during operation of the alternator 22 and the engine 18.

Referring to FIGS. 1 and 6, the control panel 26, or instrument panel, is supported on a front portion 14C of the frame 14. The illustrated control panel 26 is securely fastened to the frame 14 such that the control panel 26 is not easily or readily detachable from the frame 14. In the illustrated construction, the control panel 26 is composed of stamped steel. In other constructions, the control panel 26 may be composed of roto-molded plastic which is equally strong and non-conductive, yet lighter and easier to form. Additionally, a vinyl sticker (not shown) may be provided over the control panel 26 to help visually organize the components.

The illustrated control panel 26 includes a plurality of outlets 54 and switches 58 to facilitate interfacing with a secondary device (e.g., a power tool, a work light, a pump, a blower, or the like). In the illustrated construction, each switch 58 is associated with one outlet 54 to selectively provide power to that outlet 54. One of the switches is a master power switch 58A operable to turn the generator 10 on and off. In some constructions, the control panel 26 may additionally include indicators (e.g., LED's, gauges, or the like) to indicate when the generator 10 is running, how much fuel is left in the fuel tank 46, how much power is being generated by the generator 10, and/or how much power is being used.

As shown in FIGS. 1 to 6, the generator 10 includes a handle assembly 62 to assist in moving (e.g., pushing and pulling) the generator 10 to, from, and around a work site. As shown in the illustrated construction, the handle assembly 62 is pivotally coupled to the frame 14 with a slotted bracket 66 and three pivot brackets 70. In other constructions, the handle assembly 62 may be pivotally coupled to the frame 14 using other suitable coupling means.

In the illustrated construction, the handle assembly 62 is movable from a first or upright position (FIG. 4), in which the handle assembly 62 is used to move the generator 10, and a second or stored position (FIG. 5), in which the overall dimension of the generator 10 is minimized. For example, when in the upright position, the handle assembly 62 extends from the top portion 14B of the frame 14 substantially perpendicular to a plane 74 defined by the top portion 14B. The handle assembly 62 may be releasably secured in the upright position by a detent, cotter pin, latch, or other suitable fastening means. When in the stored position, the handle assembly 62 lies across the top portion 14B of the frame 14, such that the handle assembly 62 is substantially parallel to the plane 74. In some constructions (not shown), the handle assembly 62 may additionally or alternatively be a telescoping handle assembly. In still other constructions, the handle assembly 62 may be securely mounted to the frame 14 in a single position (e.g., the upright position).

The generator 10 also includes a lift hook assembly 78 to assist in moving (e.g., lifting and lowering) the generator 10. The lift hook assembly 78 facilitates attachment of the generator 10 to a crane, hoist, jib, or the like to lift and/or lower the generator 10 around a work site. In the illustrated construction, the lift hook assembly 78 is pivotally coupled to the frame 14 proximate to the middle of the top portion 14B. As shown in FIG. 6, the lift hook assembly 78 is coupled to the frame 14 by two slotted brackets 82, although other suitable coupling means may also be employed.

In the illustrated construction, the lift hook assembly 78 is movable from a first or upright position (FIG. 5), in which the lift hook assembly 78 is used to move the generator 10, and a second or stored position (FIG. 4), in which the overall dimension of the generator 10 is minimized. For example, when in the upright position, the lift hook assembly 78 extends from the top portion 14B of the frame 14 substantially perpendicular to the plane 66. The lift hook assembly 78 may be releasably secured in the upright position by a detent, cotter pin, latch, or other suitable fastening means. When in the stored position, the lift hook assembly 78 lies across the top portion 14B of the frame 14, such that the lift hook assembly 78 is substantially parallel to the plane 74. In some constructions, the lift hook assembly 78 may be securely mounted to the frame 14 in a single position (e.g., the upright position).

Figure 3:
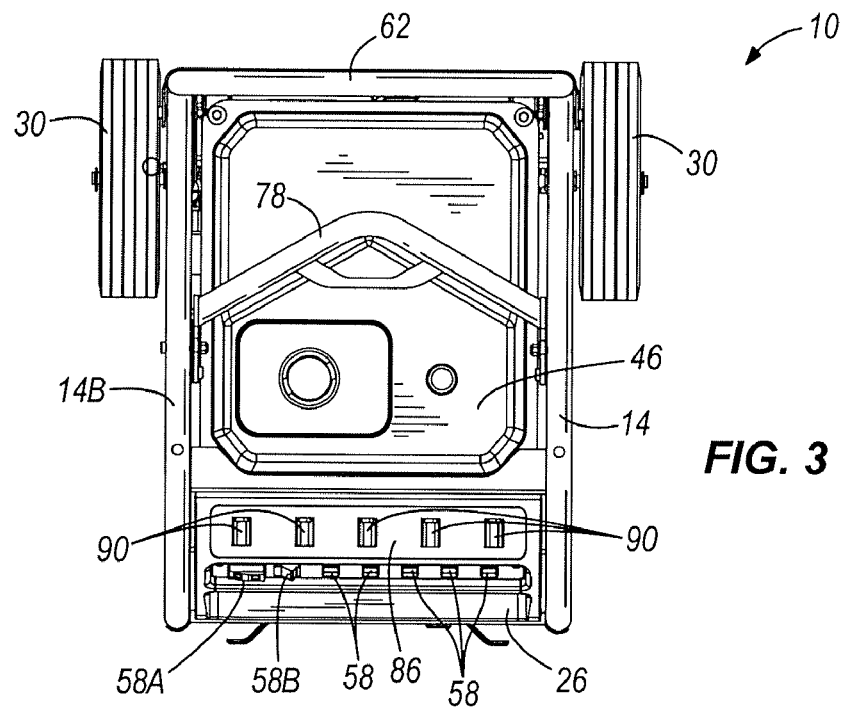
FIG. 3 is a top view of the power-generating apparatus shown in FIG. 1.

In some constructions, such as the illustrated construction, the generator 10 includes a battery charger 86. The illustrated battery charger 86 is structurally and electrically incorporated into the generator 10. In the illustrated construction, the battery charger 86 includes four receptacles 90 (FIG. 7) operable to charge a battery pack, such as, for example, a power tool battery pack 94 (FIG. 8). However, it should be readily apparent to one skilled in the art that the battery charger 86 may include fewer or more receptacles 90. As shown in FIGS. 1 and 3, the receptacles 90, or battery ports, are mounted on the control panel 26 such that a user can quickly and easily attach one or more battery packs 94 to the battery charger 86. In other constructions, the receptacles 90 may be mounted on different portions of the generator 10. In the illustrated construction, one of the switches 58B is electrically coupled to the battery charger 86 to selectively provide power to the battery charger 86. In other constructions, the battery pack(s) 94 may be automatically charged whenever the generator 10 (e.g., the engine 18 and the alternator 22) is running.

Figure 7:
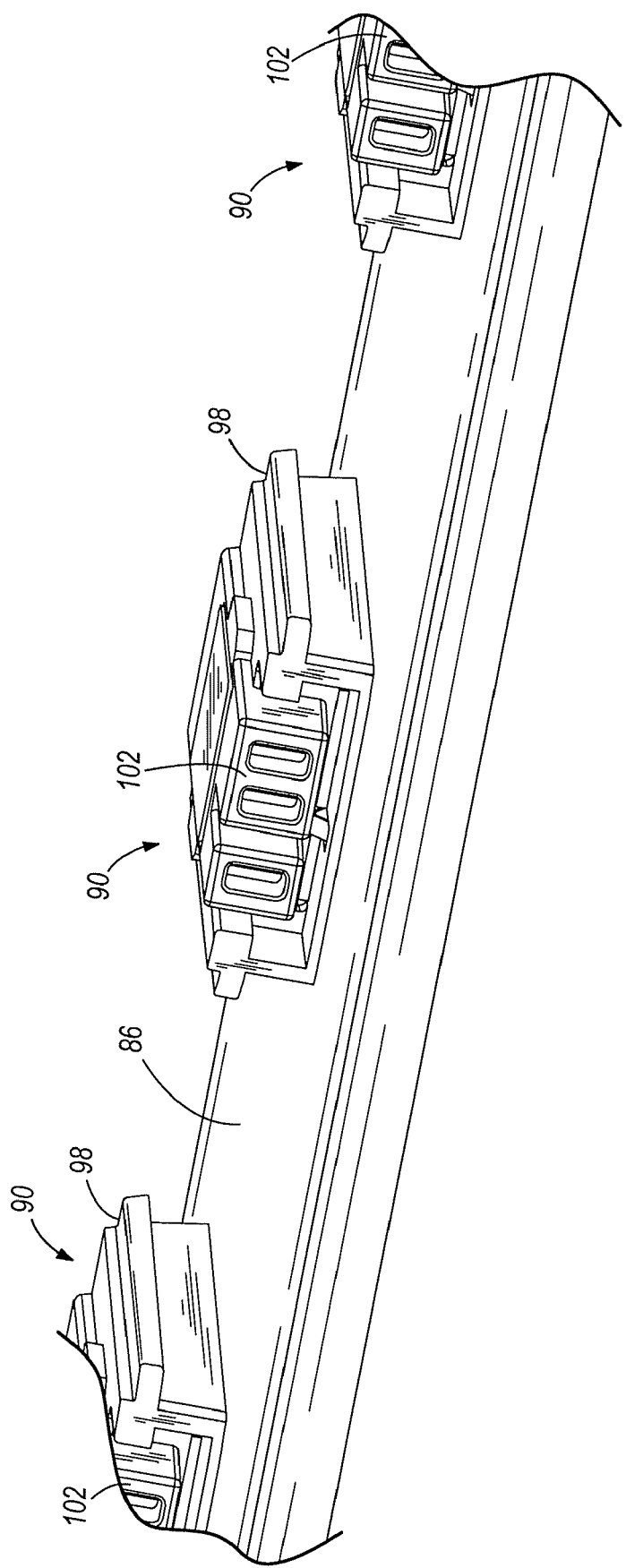
FIG. 7 is an enlarged perspective view of a battery charger receptacle of the power-generating apparatus shown in FIG. 1.
Figure 8:
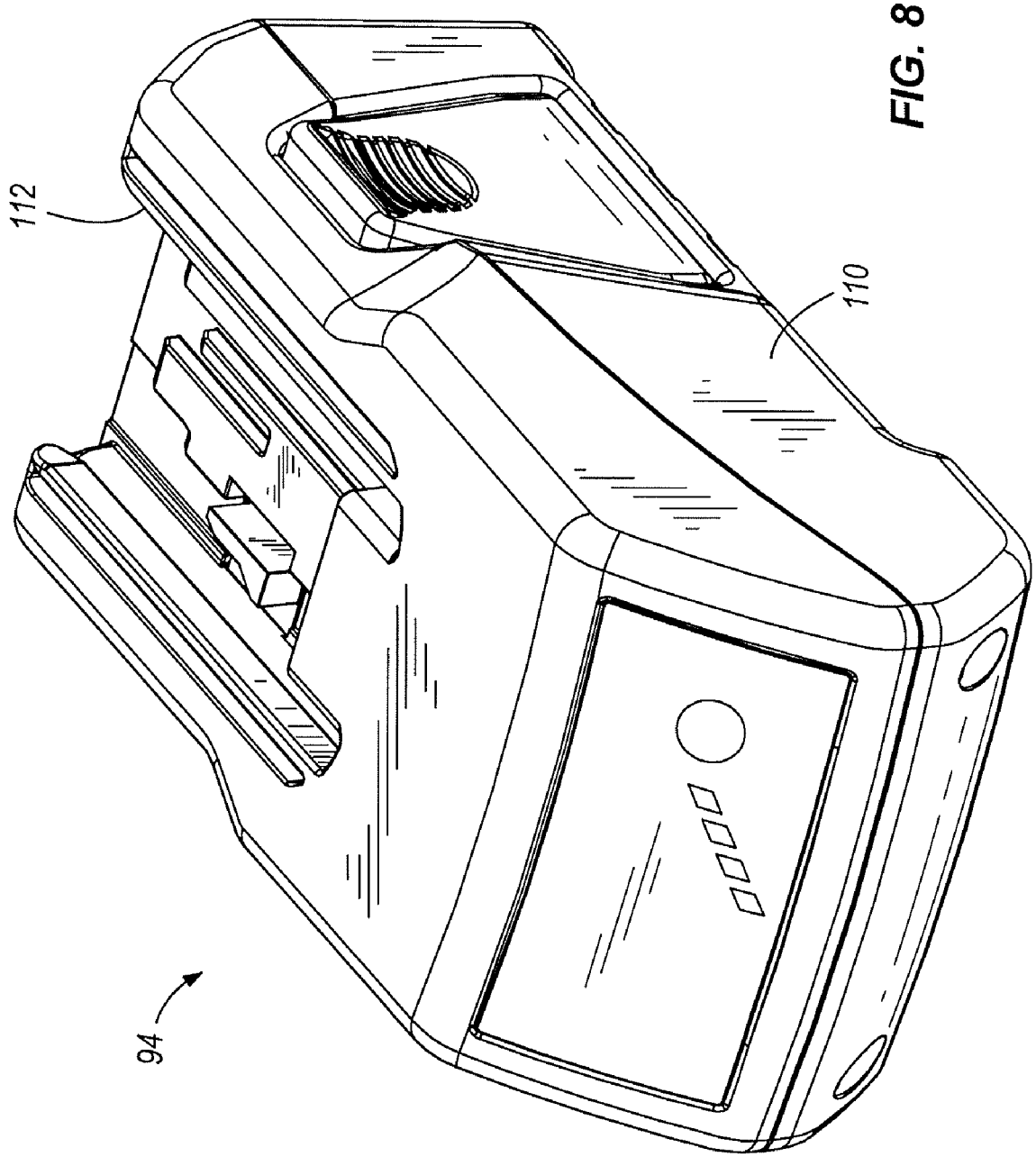
FIG. 8 is a perspective view of a battery pack for use with the power-generating apparatus shown in FIG. 1.

As shown in FIG. 7, each receptacle 90 includes a battery support portion 98 and a terminal assembly 102. The support portion 98 engages and supports the battery pack 94 on the generator 10, while the terminal assembly 102 electrically couples to corresponding terminals on the battery pack 94. The terminal assembly 102 is also electrically coupled to a battery charging circuit 106 (schematically illustrated in FIG. 9) positioned in the control panel 26. The charging circuit 106 is operable to transfer power from the alternator 22 to the battery pack 94 to thereby charge the battery pack 94.

In such constructions, the incorporated battery charger 86 eliminates the need for a separate battery charger to be transported to and from the work site (e.g., the user does not have to carry a battery charger (along with a generator) to the work site). Also, the incorporated battery charger 86 does not use one of the limited number of outlets 54 provided on the generator 10 (e.g., the user does not have to plug a separate charger into the generator 10). In addition, the battery charger components and/or the battery pack(s) 94 connected to the battery charger 86 will be at least partially protected by the frame 14 of the generator 10 versus having an external charger that is fully exposed to the elements (e.g., rain, falling debris, etc.).

In some constructions, the battery charger 86 may be similar to the that disclosed in U.S. Pat. No. 6,806,680, issued Oct. 19, 2004, the entire contents of which is hereby incorporated by reference. Additionally or alternatively, the battery charging circuit 106 and operation of the battery charger 86 may be similar to that disclosed in U.S. Pat. No. 6,222,343, issued Apr. 24, 2001; U.S. Pat. No. 6,456,035, issued Sep. 24, 2002; and U.S. patent application Ser. No. 10/228,168, filed on Aug. 26, 2002; the entire contents of all of which are hereby incorporated by reference.

As shown in FIG. 8, the battery pack 94 includes a housing 110 and at least one rechargeable battery cell (not shown) supported within the housing 110. The housing 110 defines a support portion 112 for supporting the battery pack 94 on an electrical device, such as, for example, a cordless power tool (e.g., a drill, a circular saw, a reciprocating saw, a powered screwdriver, or the like) to selectively power the power tool. In addition, the battery pack 94 is removable from the power tool and connectable to the battery charger 86 of the generator 10, as well as to other stand-alone battery chargers. In the illustrated construction, the support portion 112 provides a C-shaped cross section which is connectable to a complementary T-shaped cross section of the support portion 98 of the battery charger 86 or other electrical device.

The illustrated battery pack 94 also includes a terminal assembly (not shown) operable to electrically connect the battery cell(s) in the battery pack 94 to the electrical device or the battery charger 86. In some constructions, the terminal assembly may include, for example, a positive battery terminal, a ground terminal, and a sense terminal. In the illustrated construction, the battery pack terminals engage corresponding battery charger terminals of the terminal assembly 102 when the battery pack 94 is supported on the receptacle 90.

In the illustrated construction, the battery pack 94 is a 21V battery pack including five approximately 4.2V battery cells connected in series. In other constructions, the battery pack 94 may have another nominal battery voltage, such as, for example, 9.6V, 12V, 14.4V, 24V, etc., to power the power tool and be charged by the battery charger 86. It should be readily apparent to one skilled in the art that, in other constructions, the battery cells may have a different nominal cell voltage and/or may be connected in another configuration, such as, for example, in parallel or in a parallel/series combination.

The battery cells may be any rechargeable battery cell chemistry type, such as, for example, nickel cadmium (NiCd), nickel-metal hydride (NiMH), Lithium (Li), Lithium-ion (Li-ion), other Lithium-based chemistries, or other rechargeable battery cell chemistries. In the illustrated construction, the battery cells are Lithium-ion (Li-ion) battery cells. For example, the battery cells can have a chemistry of Lithium-Cobalt (Li—Co), Lithium-Manganese (Li—Mn) Spinel, Li—Mn Nickel, or the like.

In some constructions, the power tool battery packs 94 may be similar to that shown and described in U.S. Pat. Nos. 7,157,882, issued Jan. 2, 2007; 7,176,654, issued Feb. 13, 2007; and 7,253,585, issued Aug. 7, 2007; and in U.S. patent application Ser. Nos. 11/138,070 filed May 24, 2005; 11/139,020 filed May 24, 2005; 11/165,615 filed Jun. 22, 2005; and 11/250,931 filed Oct. 14, 2005; the entire contents of all of which are hereby incorporated by reference.

In a typical generator, a relatively heavy and expensive lead-acid type battery is used to start an internal combustion engine. Typical generators with electric start have provisions to charge the stationary lead acid starting battery. Typically, the stationary battery is recharged by an alternator coupled to the engine, with a maximum output around 12-14 volts. The illustrated design, however, may require power from the generator 10 in order to rapidly charge higher voltage power tool battery packs, such as, for example, 12-40 volt battery packs.

Figure 9:
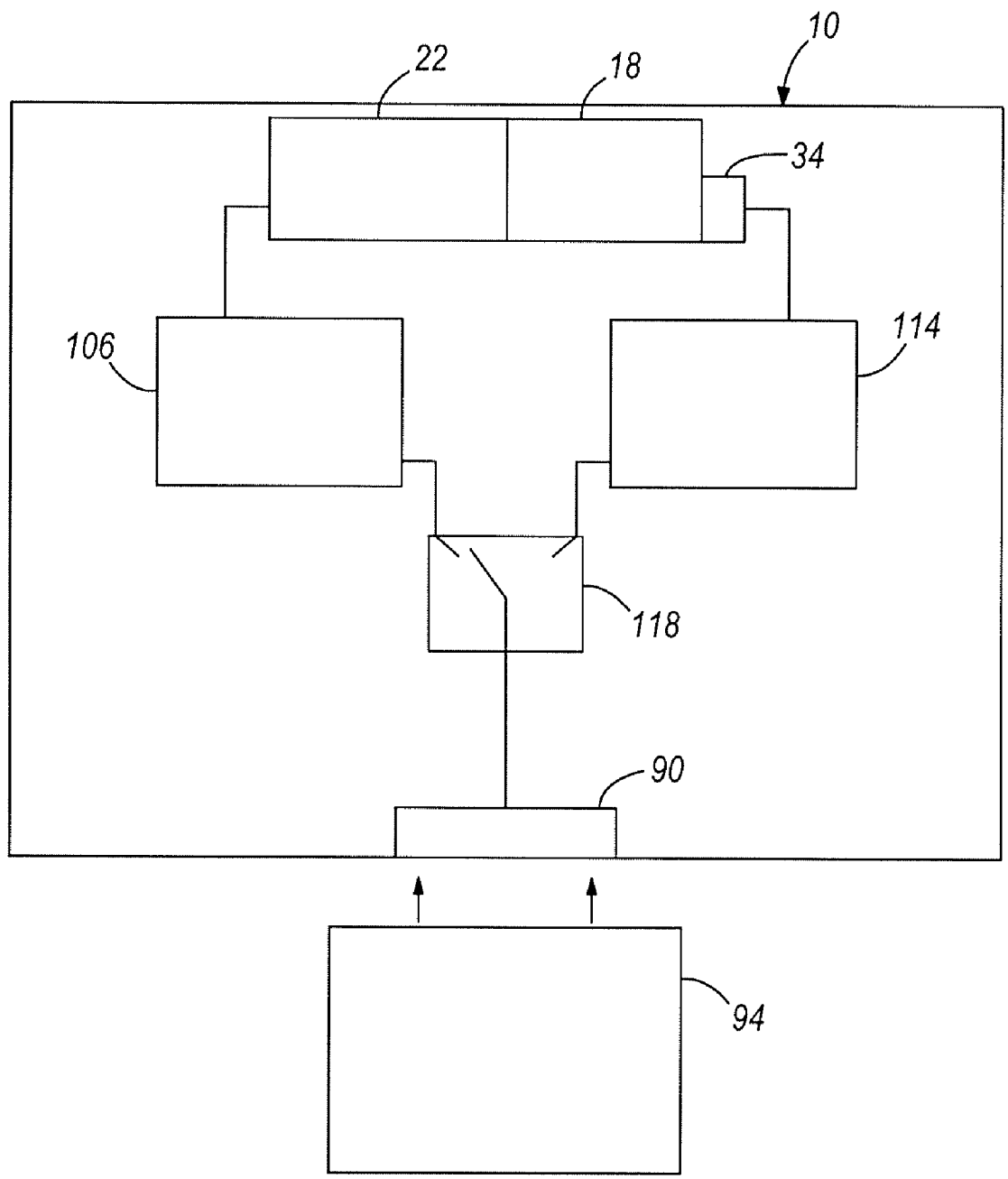
FIG. 9 is a schematic diagram of the power-generating apparatus shown in FIG. 1.

In some aspects and in some constructions, the generator 10 includes an engine start circuit 114 (schematically illustrated in FIG. 9). In the illustrated construction, a battery pack provides power to the starter motor 34 through the engine start circuit 114 to start the engine 18. As shown in FIG. 9, the power tool battery pack(s) 94 that are rechargeable by the battery charger 86 provides this power to the starter motor 34.

When the illustrated engine start circuit 114 is included with the generator 10, a user no longer needs a separate engine start battery, but is able to use the power tool battery pack(s) 94 to start the engine 18. In the illustrated construction, the same interface (e.g., the receptacles 90) between the battery pack 94 and the battery charging circuit 106 (if a charging circuit is provided) is used to supply power from the battery pack(s) 94 to the engine start circuit 114. In other constructions (not shown), separate power and charging interfaces may be provided on the generator 10.

As shown in FIG. 9, the generator 10 also includes a relay 118. In the illustrated construction, the relay 118 is electrically coupled between the receptacles 90, the battery charging circuit 106, and the engine start circuit 114 to either provide power from the battery pack 94 to the starter motor 34 or from the alternator 22 to the battery pack 94. That is, when the engine 18 is not running, the relay 118 electrically couples the battery pack 94 to the starter motor 34 to facilitate starting of the engine 18. When the engine 18 is running, the relay 118 electrically couples the alternator 22 to the battery pack 94 to facilitate charging of the battery pack 94.

In some constructions, the relay 118 may be coupled to the engine 18 to monitor the revolutions per minute (RPM's) of the engine 18. In such constructions, when the RPM's are equal to zero (e.g., when the engine 18 is off), the relay 118 is switched to electrically couple the battery pack 94 with the engine start circuit 114. When the RPM's are greater than zero (e.g., when the engine 18 is running), the relay 118 is switched to electrically couple the battery pack 94 with the battery charging circuit 106.

In some constructions, the generator 10 may include a separate starter assembly in case the power tool battery pack(s) 94 does not have sufficient remaining power/capacity to start the engine 18. For example, the generator 10 may include a pull-cord starter. Additionally or alternatively, the generator 10 may include a connection for another power supply (e.g., for a lead-acid type battery).

Figure 2:
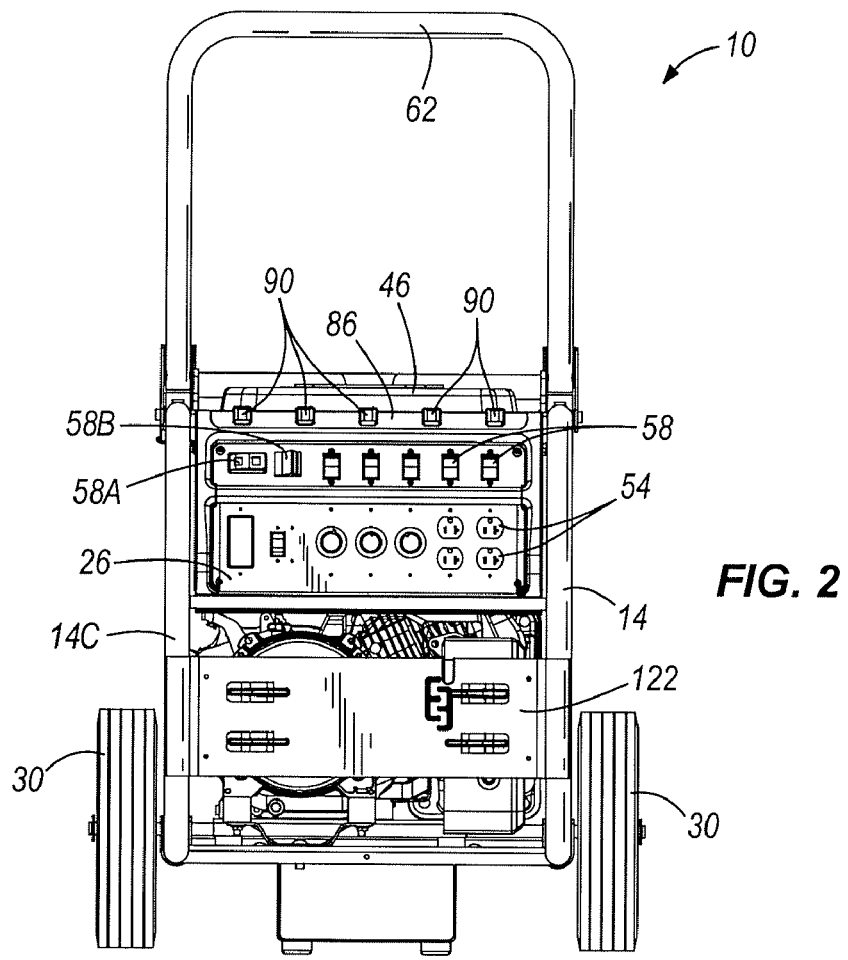
FIG. 2 is a front view of the power-generating apparatus shown in FIG. 1.
Figure 5:
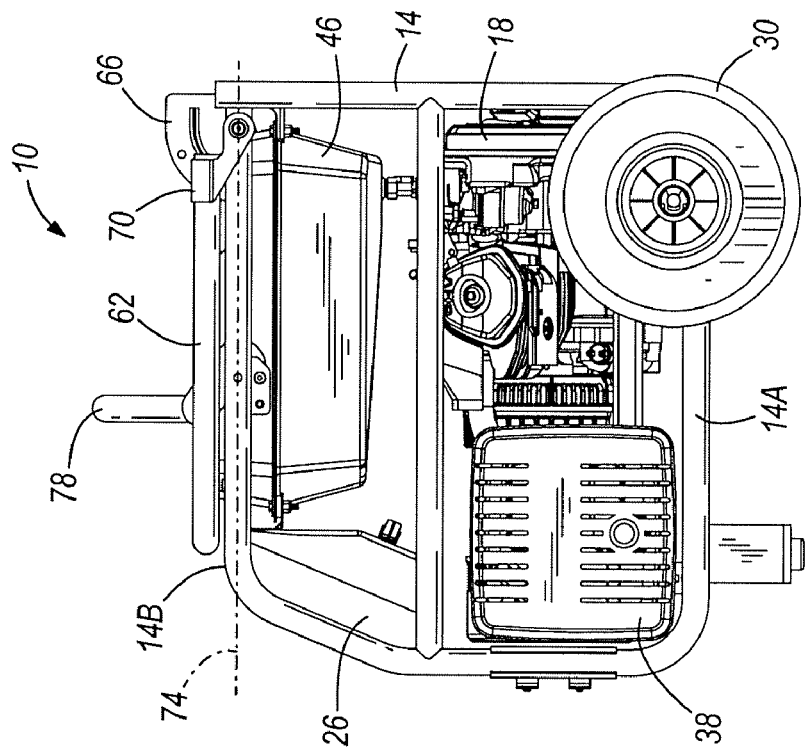
FIG. 5 is a right side view of the power-generating apparatus shown in FIG. 1.
Figure 4:
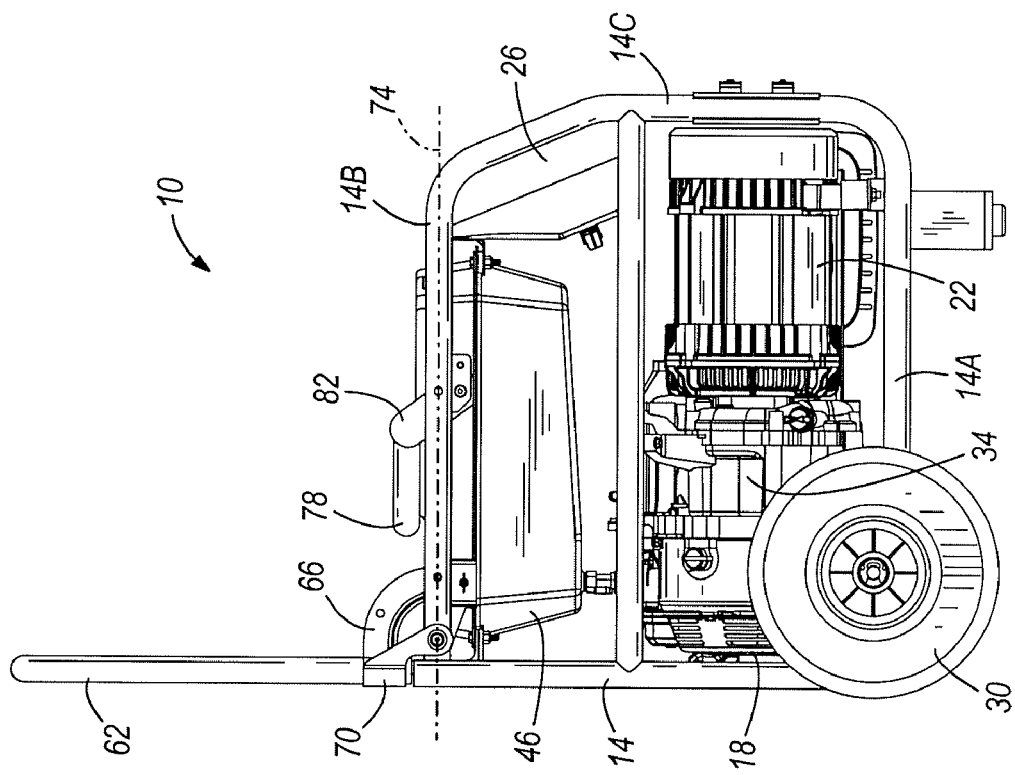
FIG. 4 is a left side view of the power-generating apparatus shown in FIG. 1.

In the illustrated construction, the generator 10 is usable with an extension cord (not shown) that is connectable to one of the outlets 54. As shown in FIGS. 1 and 2, the generator 10 includes an extension cord holder 122 mounted to the front portion 14C of the frame 14 to facilitate storage of the extension cord when not in use. When using the extension cord with the generator 10, there may be a voltage drop across the extension cord, for example, based on the length of the cord. In most cases, a user may simply use the device connected to the cord at a lower operating voltage or may move the device closer to the generator (e.g., using a shorter cord).

In some aspects and in some constructions (see FIG. 5), the generator 10 may communicate with the extension cord to supply an appropriate amount of power through the cord to the cord outlet based on a condition of the cord (e.g., length, capacity, wear, etc.) and/or on a condition of the secondary device connected to the cord (e.g., capacity of the device, operating condition of the device, etc.). In such constructions, the extension cord includes a plug having a communication/identification part to identify a condition of the cord and/or the device (e.g., a projection indicating the cord's length), and the generator 10 has a complementary communication/identification part (e.g., a receptacle receiving the projection) to determine the condition of the cord and/or the device.

In the illustrated construction, the "smart" extension cord ensures that the proper amount of power is available at the outlet of the cord, regardless of the length of the cord. The cooperation between the "smart" extension cord and the generator 10 provides electronic correction of the voltage drop associated with the cord. The "smart" extension cord's plug includes a part that identifies the cord's length. On the outlets 54 of the generator 10 are sensors that detect the "smart" extension cord's plug. Once the sensors detect the communicated condition (e.g., the cord's length), the generator 10 will supply the appropriate amount of power to the cord, depending on the condition (e.g., the cord's length).

Portions of the extension cord and the generator 10, such as, for example, the connecting portions and the outlets 54, may be similar to that disclosed in U.S. Pat. Nos. 6,368,133, issued Apr. 9, 2002; and 6,609,924, issued Aug. 26, 2003; the entire contents of both of which are hereby incorporated by reference.

Portions of the generator 10, such as the battery charger 86, the frame 14, etc., may be similar to that disclosed in U.S. patent application Ser. No. 10/289,621, filed Nov. 7, 2002; U.S. patent application Ser. No. 10/840,703, filed May 6, 2004; and U.S. Pat. No. 6,982,541, issued Jan. 3, 2006; the entire contents of all of which are hereby incorporated by reference.

The illustrated power-generating apparatus 10 may be supported on and/or provide a power source for a cart similar to that disclosed in U.S. patent application Ser. Nos. 11/136, 618, filed May 23, 2005; 11/136,305, filed May 23, 2005; and 29/230,508, filed May 23, 2005; the entire contents of all of which are hereby incorporated by reference.

The independent aspects and independent constructions described above and illustrated in the figures are presented by way of example only and are not intended as a limitation upon the concepts and principles of the present invention. Various features and advantages of the invention are set forth in the following claims.

What is claimed is:

1. A power-generating apparatus comprising:
   a frame;
   an engine supported by the frame, the engine including a starter motor operable to start the engine;
   an alternator coupled to the engine and operable to convert mechanical energy from the engine into electrical energy;
   a battery charger supported by the frame and electrically coupled to the alternator, the battery charger operable to charge a battery pack with the electrical energy from the alternator;
   an engine start circuit electrically coupled to the starter motor and the battery charger, the engine start circuit operable to direct power from the battery pack connected to the battery charger to the starter motor to start the engine; and
   a relay electrically coupled to the battery charger and the engine start circuit, the relay movable between a first position when the engine is running, whereby the relay provides the electrical energy from the alternator to the battery charger, and a second position when the engine is not running, whereby the relay provides the power from the battery pack to the starter motor,
   wherein the relay monitors revolutions per minute of the engine, and wherein the relay is moved to the first position when the revolutions per minute are greater than zero and is moved to the second position when the revolutions per minute are equal to zero.

2. The power-generating apparatus of claim 1 and further comprising a control panel supported by the frame, wherein the control panel includes an outlet electrically coupled to the alternator, and further wherein the outlet is operable to supply the electrical energy from the alternator to a secondary device.

3. The power-generating apparatus of claim 2 wherein the battery charger is positioned on the control panel.

4. The power-generating apparatus of claim 1 wherein the frame includes a top portion defining a plane, and further comprising a lift hook assembly pivotally coupled to the top portion, and wherein the lift hook assembly is movable between a first position, whereby the lift hook assembly is substantially parallel to the plane, and a second position, whereby a portion of the lift hook assembly extends from the top portion substantially perpendicular to the plane.

5. The power-generating apparatus of claim 1 wherein the frame includes a top portion defining a plane, and further comprising a handle assembly pivotally coupled to the frame, and wherein the handle assembly is movable between a first position, whereby the handle assembly is substantially parallel to the plane, and a second position, whereby a portion of the handle assembly extends from the frame substantially perpendicular to the plane.

6. The power-generating apparatus of claim 1, further comprising at least one wheel rotatably coupled to the frame to facilitate movement of the power-generating apparatus along a surface.

7. The power-generating apparatus of claim 1 wherein the battery pack is a power tool battery pack.

8. A power-generating apparatus comprising:
   a frame;
   an engine supported by the frame, the engine including a starter motor operable to start the engine;
   an alternator coupled to the engine and operable to convert mechanical energy from the engine into electrical energy;
   a battery charger securely fastened to the frame and electrically coupled to the alternator, the battery charger including at least one receptacle, each receptacle configured to support a battery pack;
   an engine start circuit electrically coupled to the starter motor and the battery charger, the engine start circuit operable to direct power from the battery pack supported by the at least one receptacle to the starter motor to start the engine; and
   a relay electrically coupled to the battery charger and the engine start circuit, the relay movable between a first position when the engine is running, whereby the relay provides the electrical energy from the alternator to the battery charger, and a second position when the engine is not running, whereby the relay provides the power from the battery pack to the starter motor, wherein the relay monitors revolutions per minute of the engine, and wherein the relay is moved to the first position when the revolutions per minute are greater than zero and is moved to the second position when the revolutions per minute are equal to zero.

9. The power-generating apparatus of claim 8 and further comprising a control panel supported by the frame, wherein the control panel includes an outlet electrically coupled to the alternator, and further wherein the outlet is operable to supply the electrical energy from the alternator to a secondary device.

10. The power-generating apparatus of claim 9 wherein the control panel is securely fastened to the frame and the battery charger is positioned on the control panel.

11. The power-generating apparatus of claim 8 wherein the frame includes a top portion defining a plane, and further comprising a lift hook assembly pivotally coupled to the top portion, and wherein the lift hook assembly is movable between a first position, whereby the lift hook assembly is substantially parallel to the plane, and a second position, whereby a portion of the lift hook assembly extends from the top portion substantially perpendicular to the plane.

12. The power-generating apparatus of claim 8 wherein the frame includes a top portion defining a plane, and further comprising a handle assembly pivotally coupled to the frame, and wherein the handle assembly is movable between a first position, whereby the handle assembly is substantially parallel to the plane, and a second position, whereby a portion of the handle assembly extends from the frame substantially perpendicular to the plane.

13. The power generating apparatus of claim 8 wherein the battery pack is a power tool battery pack.

14. A power-generating apparatus comprising:
a frame;
an engine supported by the frame and including a starter motor;
an alternator coupled to the engine and operable to convert mechanical energy from the engine into electrical energy;
a control panel supported by the frame, the control panel including an outlet electrically coupled to the alternator and operable to supply the electrical energy from the alternator to a secondary device;
a battery charger positioned on the control panel and electrically coupled to the alternator, the battery charger including at least one receptacle;
a battery pack configured to be supported by the at least one receptacle to facilitate charging of the battery pack;
an engine start circuit electrically coupled to the starter motor and the battery charger, the engine start circuit operable to direct power from the battery pack to the starter motor to start the engine; and
a relay electrically coupled to the battery charger and the engine start circuit, the relay movable between a first position when the engine is running, whereby the relay provides the electrical energy from the alternator to the battery charger, and a second position when the engine is not running, whereby the relay provides the power from the battery pack to the starter motor,
wherein the relay monitors revolutions per minute of the engine, and wherein the relay is moved to the first position when the revolutions per minute are greater than zero and is moved to the second position when the revolutions per minute are equal to zero.

* * * * *